US006030103A

United States Patent [19]

Gampe et al.

[11] Patent Number: 6,030,103

[45] Date of Patent: Feb. 29, 2000

[54] OPERATING ROOM LIGHT WITH ROTARY JOINT FOR ATTACHMENT OF A SWIVEL ARM

[75] Inventors: Uwe Gampe, Flörsheim; Stefan Weigand, Freigericht; Rudolf Marka, Darmstadt, all of Germany

[73] Assignee: Heraeus Holding GmbH, Hanau, Germany

[21] Appl. No.: 08/894,509

[22] PCT Filed: Jan. 23, 1997

[86] PCT No.: PCT/EP97/00301

§ 371 Date: Aug. 20, 1997

§ 102(e) Date: Aug. 20, 1997

[87] PCT Pub. No.: WO97/27421

PCT Pub. Date: Jul. 31, 1997

[30] Foreign Application Priority Data

Jan. 24, 1996 [DE] Germany ........................... 196 02 326

[51] Int. Cl.[7] ........................................................ A21S 1/04

[52] U.S. Cl. .......................... 362/404; 362/406; 362/804; 362/287; 362/35

[58] Field of Search .................................... 362/404, 405, 362/406, 272, 286, 287, 35, 804, 371, 428

[56] References Cited

U.S. PATENT DOCUMENTS 2,173,325 9/1939 Alexander ............................... 362/804
4,079,244 3/1978 Bortoluzzi ............................... 362/405
5,808,680 9/1998 Steckhan ................................ 348/370

*Primary Examiner*—Sandra O'Shea
*Assistant Examiner*—Michael J. Smith
*Attorney, Agent, or Firm*—Frishauf, Holtz, Goodman, Langer & Chick, P.C.

[57] ABSTRACT

An operating room light with ceiling suspension is provided with a shaft protruding from the ceiling and containing internal electrical conductors, the shaft being enveloped in its end region by a support body provided on its outer circumference with slip rings for establishing electrical connections between the shaft and the conductors contained in a swivel arm; the swivel arm is provided with a swivel arm head as part of a rotary joint, which envelops the support body and which contains on its barrel-shaped inside slip ring pickups for making contact with the slip rings of the support body; viewed in axial direction, the support body is provided at both of its ends with bearing bushes functioning as sliding bearings, the upper bearing bush supporting an axial bearing ring that bears thereon to hold the swivel arm head; the support body together with the bearing bushes is secured against radial and axial shifting by means of threaded pins passed through openings in the pivot as well as by a locking ring held by means of annular slot in the end region of the shaft.

By virtue of conical transition regions, it is possible to slip the swivel arm head with its slip ring pickups onto the support body in simple manner, thus providing advantages in particular for assembly and maintenance and for cases in which swivel arms are mounted one above the other.

7 Claims, 7 Drawing Sheets

OPERATING ROOM LIGHT WITH ROTARY JOINT FOR ATTACHMENT OF A SWIVEL ARM

BACKGROUND INFORMATION

The invention relates to an operating room light with ceiling suspension and at least one swivel arm through which electric conductors are routed, the said swivel arm being mounted on and rotatable around a shaft protruding from the ceiling and containing internal electric conductors, while slip rings electrically insulated from each other are disposed on the shaft in the region of its external face for the purpose of making electrical connections by means of slip ring pickups, which maintain contact by spring pressure and are housed inside a sleeve-like swivel-arm head constituting part of a rotary joint.

From DE-PS 11 93 897 there is known an operating room light with a swivel arm which is disposed on and is axially rotatable around a pivot protruding from the ceiling, the pivot being formed as a supply post through which not only electrical power but also oxygen and nitrous oxide are routed to a connection head, from which the most diverse instruments needed for the operation can be supplied. The pivot consists of a hollow pipe with attached rotary joint, which is provided with slip rings for transmission of electrical current between support arm and pivot; this is a relatively complex arrangement, since the rotary joint is assembled from a large number of individual elements such as rotary ring, spacer ring, intermediate rings, ring nut, spring rings and cams; thus it is particularly problematic, in view of the complex structure, to provide a stock of such rotary joints for modular assembly of operating room lights for various applications.

Furthermore, from DE-GM 89 13 757 [German Utility Model] there is known a video transmission system in operating room lights which describes an operating room light construction and a camera system with cable lines for transmission of video and control signals for a camera mounted in the light, the cable lines being routed internally through the operating room light suspension and slip rings for transmission of high-frequency video and control signals of a camera being provided.

This is a relatively complex structure, in which a plurality of individual segments with high assembly and adjustment expense must be used; even subsequent addition of swivellable booms proves to be problematic, since individual adaptations are necessary for the purpose.

Furthermore, from DE 40 04 648 C2 there is known a system for attachment of reflector lights to ceiling and wall surfaces, in which a connection block constituting a hollow body and a light base are provided with connecting means that can be inserted interlockingly in the connection block; the underside of the connection block is formed as a hollow-body bottom with sliding surface to permit rotary movement of the light base, and a light-base flange that can be inserted in the seating groove is used as the interlocking connecting means. A slip ring arrangement for current transmission is not provided, and so the horizontal swivelling capability lies in the angular range of about 360°.

From U.S. Pat. No. 5,379,205 there is known a swivellable holding device for a wall light, in which a first and a second swivel arm are provided with recesses for routing electrical cables; the swivelling range is restricted in this case also.

Furthermore, from DE 42 10 649 A1 there is known a device with a rotary arm for lighting the interior of furniture items from the outside; between the rotary arm and a support body there are provided actuating means for the electrical supply of the light source disposed at the end of the rotary arm, so that current flows as soon as the rotary arm is positioned outside the furniture item, whereas the current supply is interrupted when the rotary arm is positioned inside the furniture item.

OBJECTS AND SUMMARY OF THE INVENTION

The object of the invention is, starting from operating room lights according to DE-PS 11 93 897 and DE-GM 89 13 757, to achieve a reduction of the costs of parts for operating room lights by using the simplest possible rotary joints, with transmission of electrical current by slip rings, in particular to strive for high functional integration and to strive for simple mounting by subassemblies matched to each other without laborious adjustment; furthermore, it is intended that the rotary joints will also be suitable as a preassembled subassembly for subsequent modular assembly of operating room lights, and that it will entail low storage costs.

By means of the slip ring arrangement it is intended that light housings attached to the swivel arm and possibly also a video camera system and possibly also brackets for electrically powered accessory instruments mounted on a swivel arm will be connected to the lines contained in the pivot.

The object is achieved according to the invention by the features of claim 1.

It is particularly advantageous for the central region of the rotary joint to consist of an easily manufactured injection-molded plastic support body with exactly positioned slip rings.

In a preferred embodiment, the bearing bushes can be slipped onto the respective ends of the support body, an interlocking non-rotatable connection being achieved by virtue of the tongues and grooves formed by ridges; the ridges running in axial direction are directed radially outward in the manner of spokes on the end regions of the support body, whereas in the bearing bushes they are directed radially inward toward the longitudinal axis.

It is advantageous for the support body to have the necessary stability with respect to its mounting and the strength relative to the part of a boom mounted rotatably on it as the swivel arm head by virtue of sliding bearing bushes that can be slipped onto its end faces.

BRIEF DESCRIPTION OF THE DRAWINGS

It is also possible, however, to make the support body and the bearing bushes together as a single injection-molded part. Further advantageous embodiments of the invention are specified in claims 5 through 11.

One advantage is the simplicity of assembly and disassembly of the swivel arm, since laborious adjustment tasks are obviated by the use of a common spring-loaded carrier for the slip ring pickups, which carrier is mounted in the boom.

Another particular advantage is that, in addition to a simple stock of joints for modular operating room lights, relatively simple assembly is possible on the spot by slipping the swivel arm head onto the support body while simultaneously establishing electrical contact; another advantage can be seen in the fact that a plurality of support bodies can be disposed on one shaft, the associated swivel arm heads being slipped successively onto the said support bodies and immobilized against rotation by means of pins and axial bearing rings.

Another advantage can be seen in the high friction associated with sliding bearing systems compared with pure rolling bearing systems, since the bearing system is adequately movable for practical use while at the same time preventing undesired spontaneous movement of the boom; thus the additional braking systems (wearing part) which are otherwise standard are not necessary.

The subject matter of the invention is explained in more detail hereinafter by reference to FIGS. 1*a*, 1*b*, 1*c*, 1*d*, 1*e*, 2*a*, 2*b*, 2*c*, 3 and 4; to provide a better impression of perspective, the surface is partly shaded in FIGS. 1*a*, 1*b* and 1*c*.

Figure 1A:
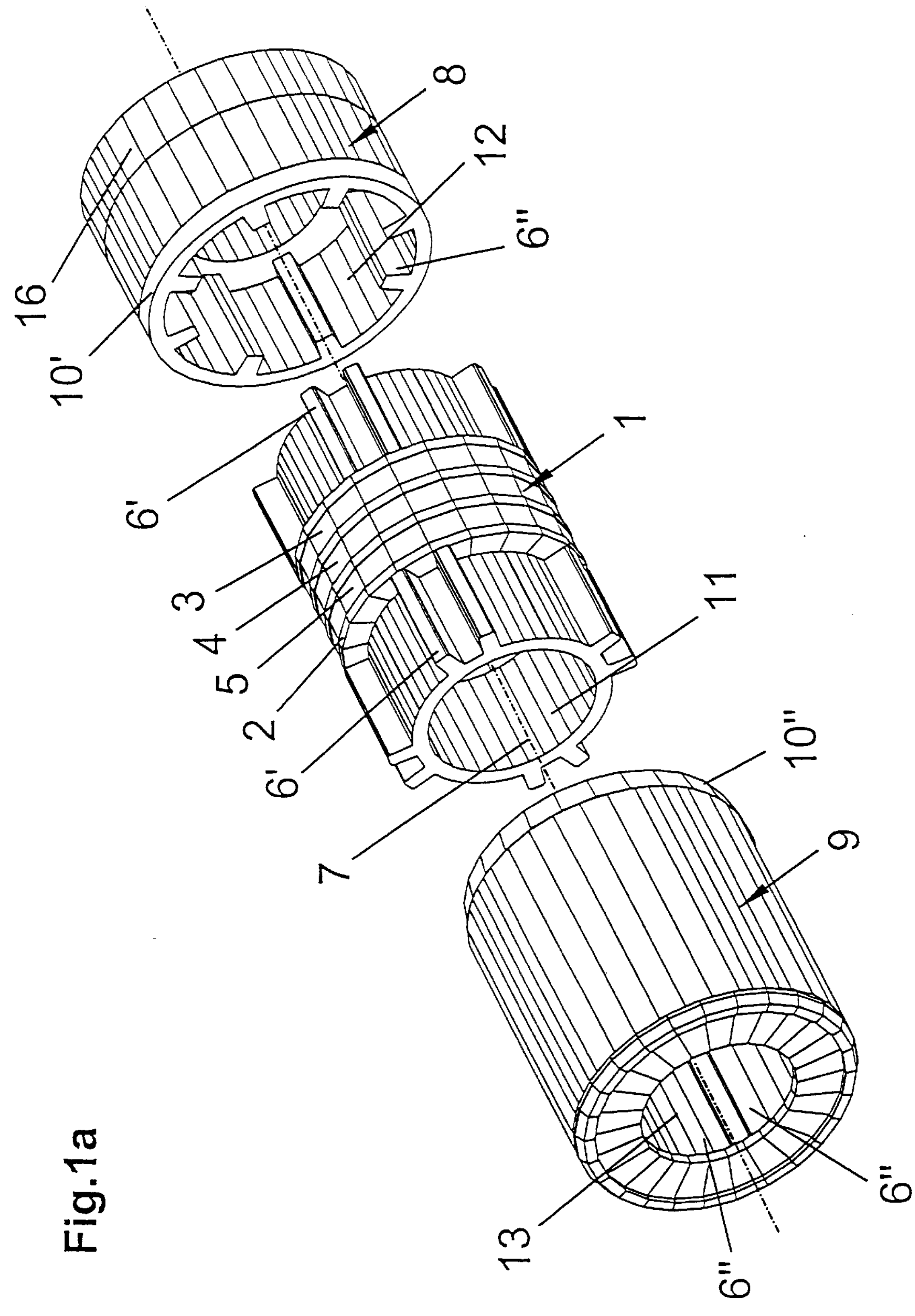
Figure 1B:
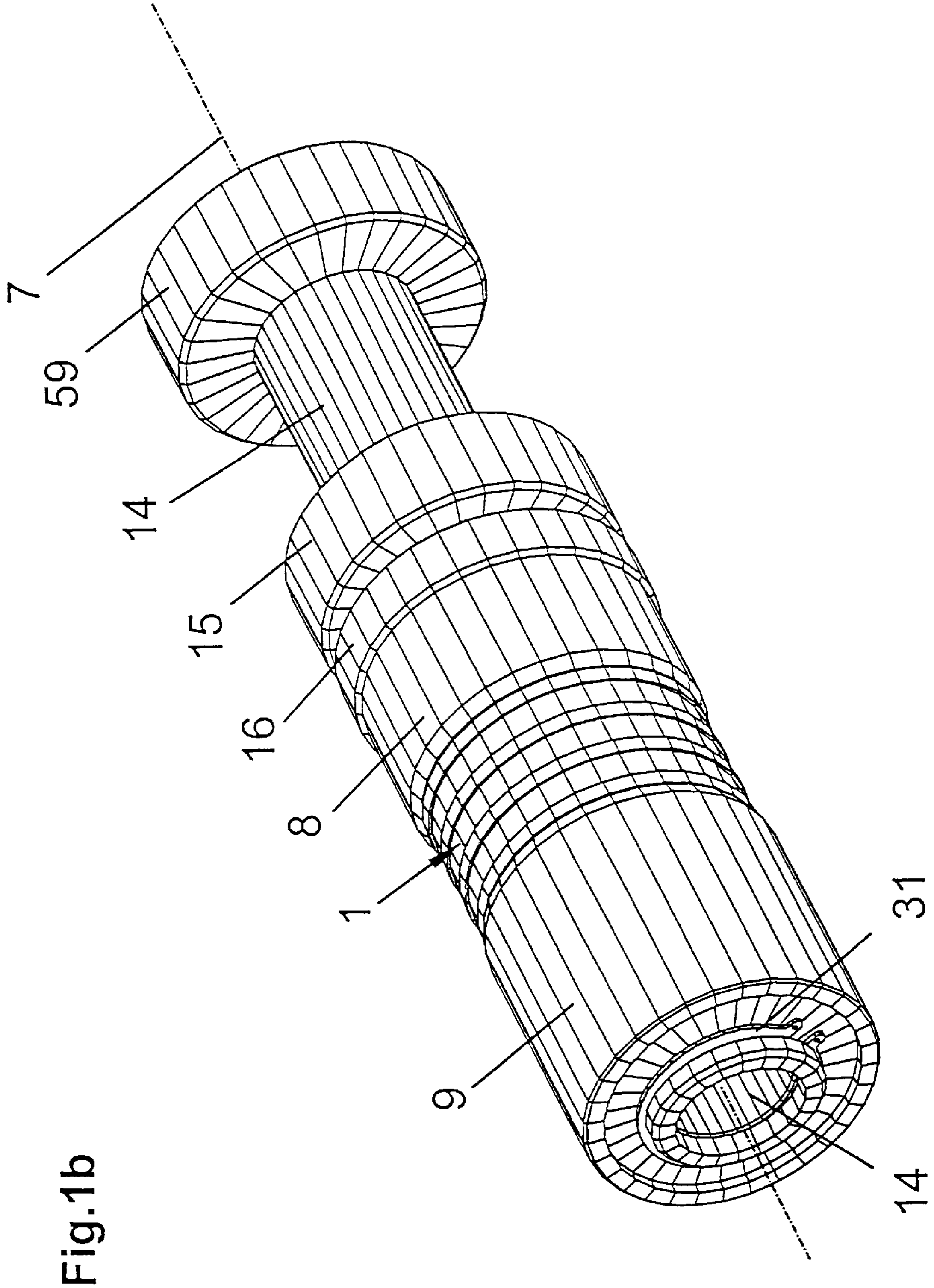
Figures 1C, 1D, 1E:
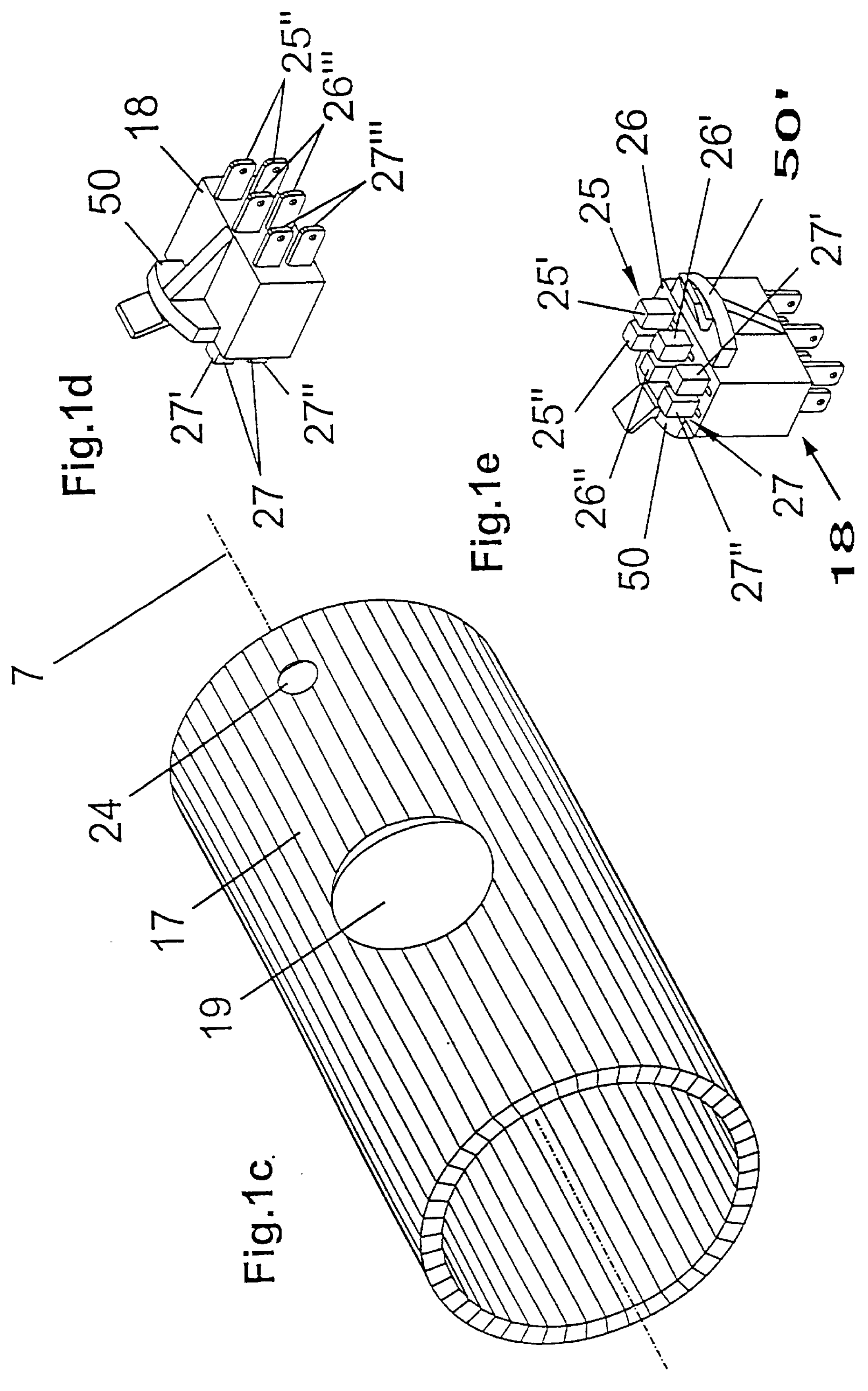
Figure 2A:
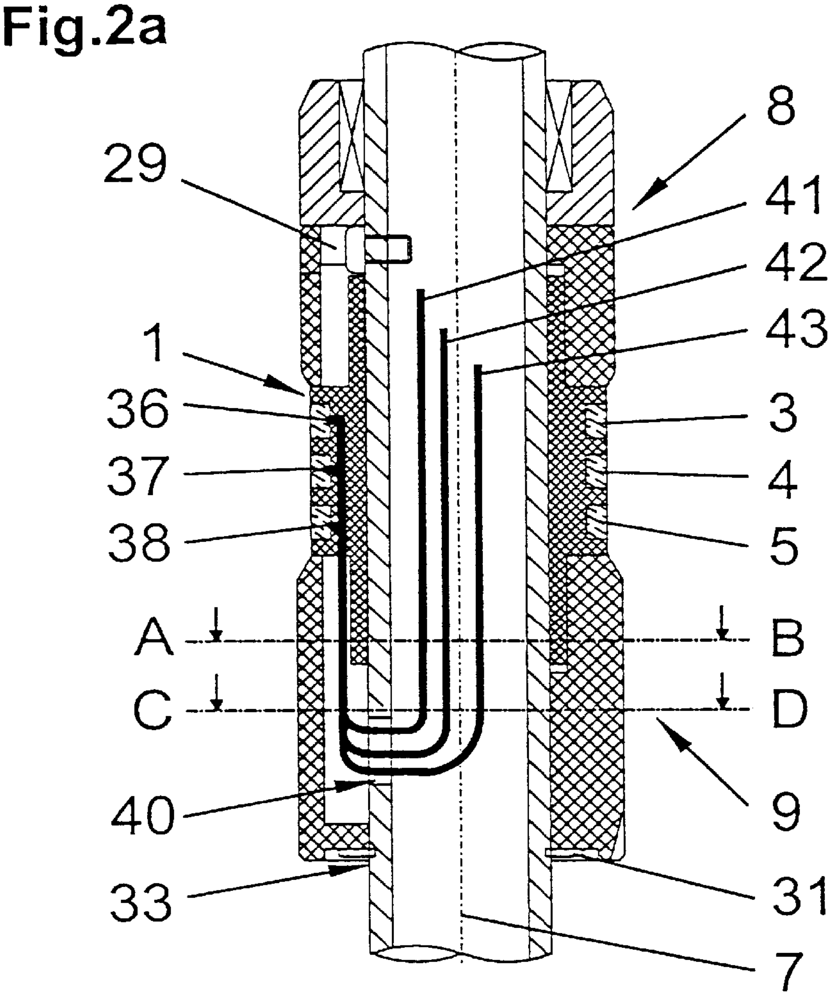
Figure 2B:
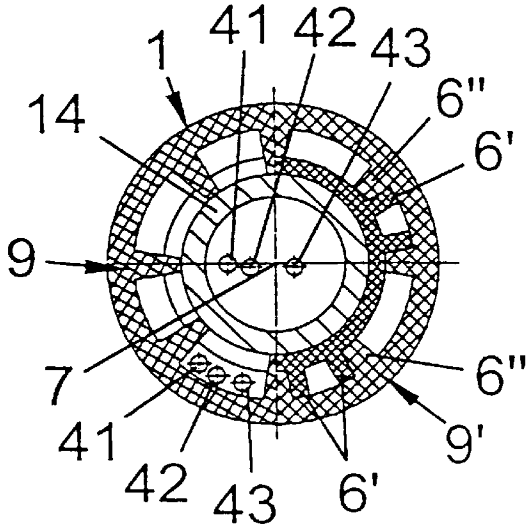
Figure 2C:
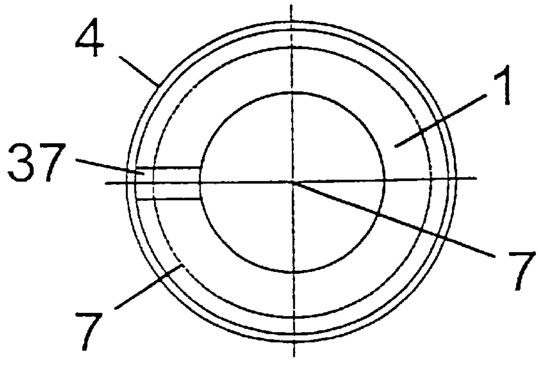

FIG. 1*a* shows an exploded diagram of the support body with the slip-on bearing bushes, FIG. 1*b* shows the support body mounted on a shaft together with the slipped-on bearing bushes, FIG. 1*c* shows the hollow cylindrical shell as part of a swivel arm head, FIG. 1*d* shows the contact carrier for slip ring pickups in the inserted position, FIG. 1*e* shows the contact carrier in inverted position, so that the slip ring pickups are visible;

FIG. 2*a* shows a longitudinal section along a slip ring body of substantially cylindrical shape, FIG. 2*b* shows, in the right portion, a cross section along line AB of FIG. 2*a* and, in the left portion, a cross section along line CD of FIG. 2*a*, FIG. 2*c* shows a cross section through a slip ring positioned on the support body.

Figure 3:
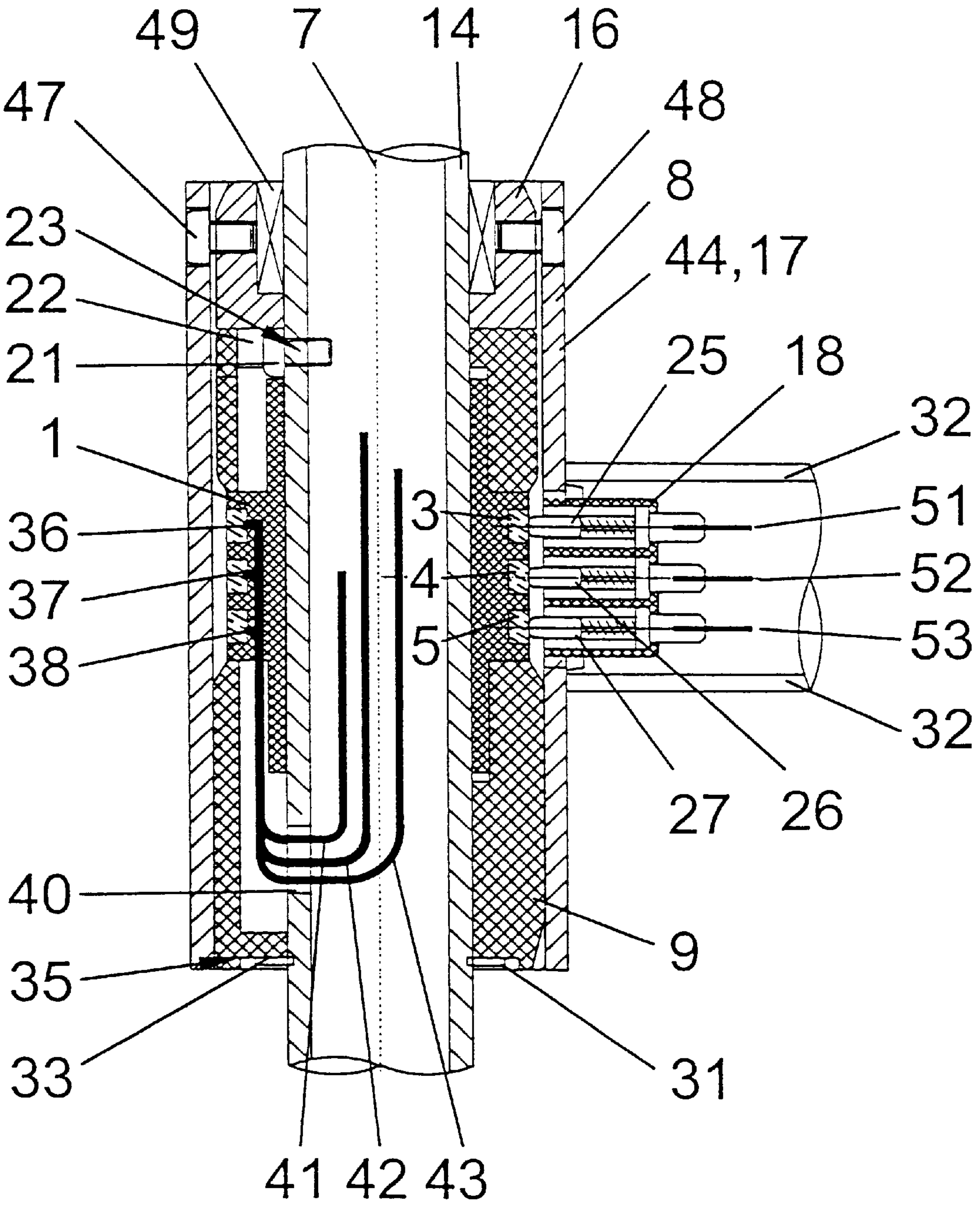

FIG. 3 shows a longitudinal section of the assembled condition of the complete rotary joint with the slip ring bodies enveloping the support arm and the associated swivel arm head with swivel arm (shown in partly cutaway view) attached thereto.

Figure 4:
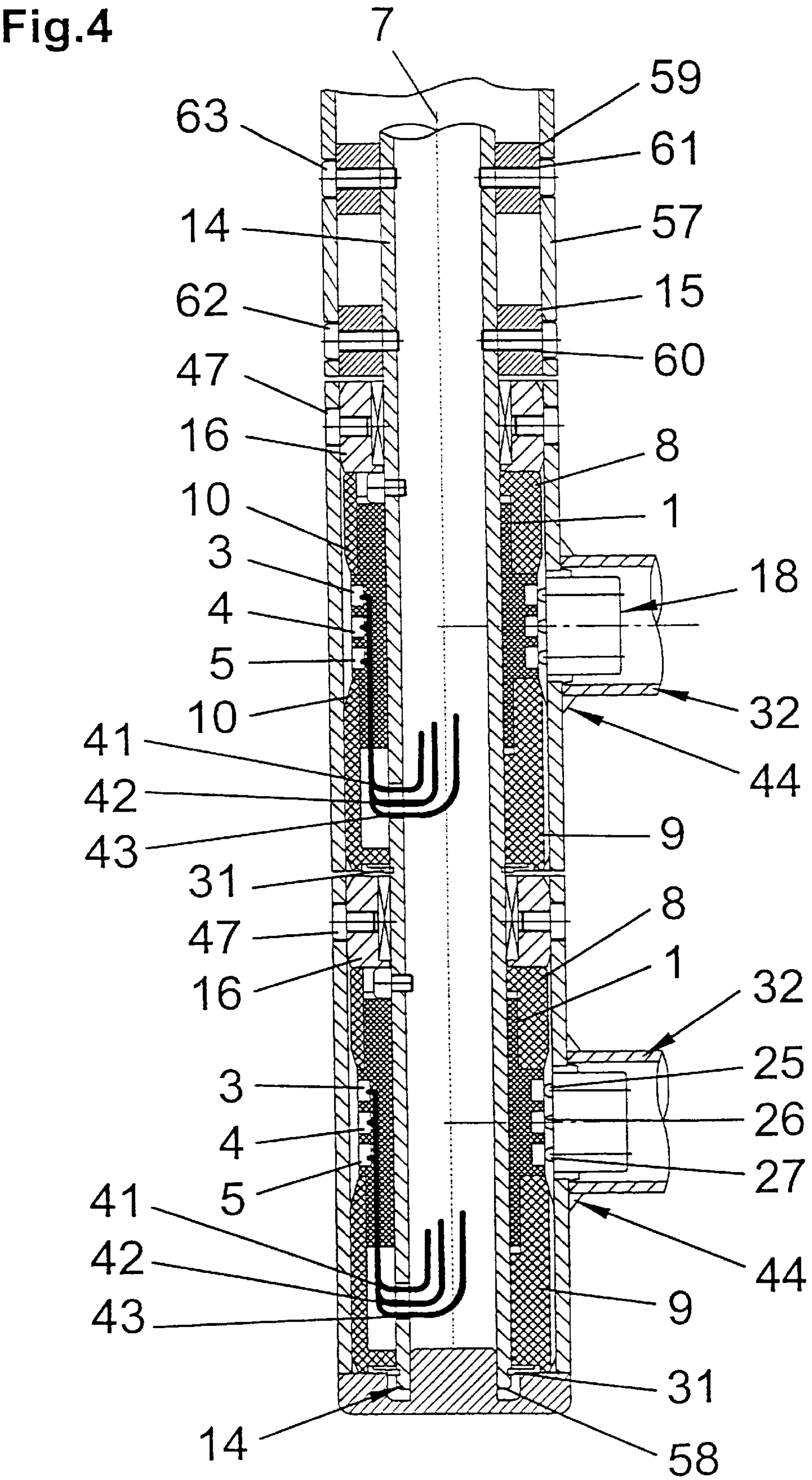

FIG. 4 schematically shows the structure of an operating room light with two support arms on a common shaft for holding two swivel arm heads.

Figure 5:
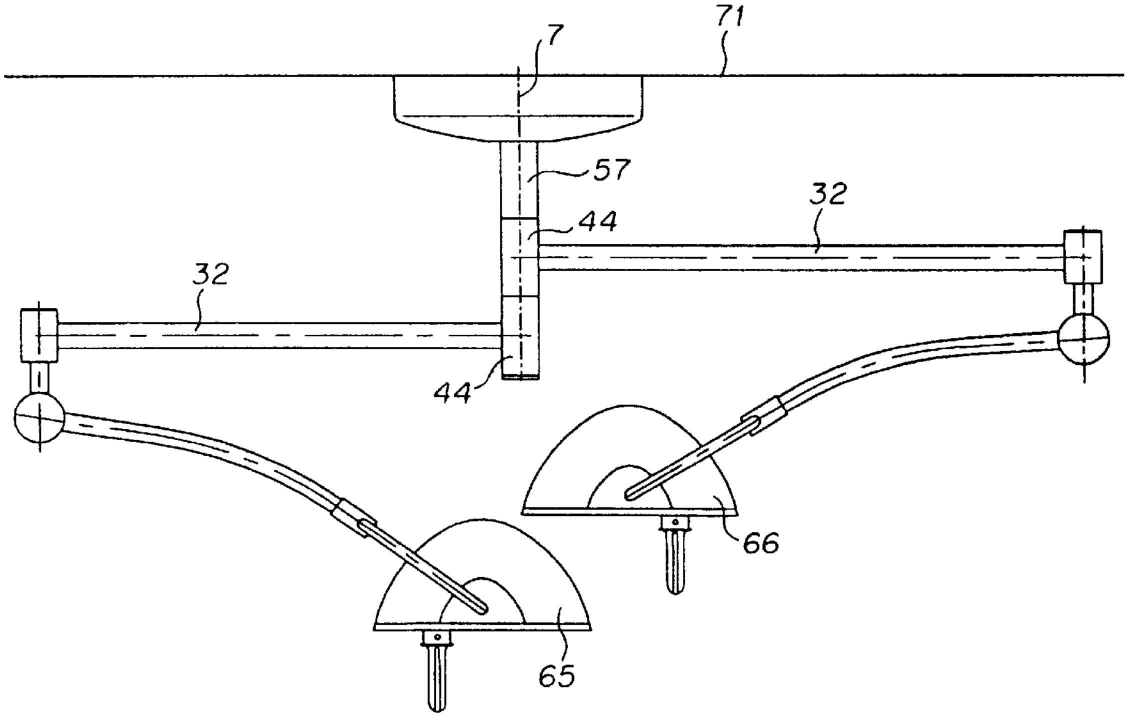

FIG. 5 shows two operating room lights, the articulated arms of which are each connected with a boom.

DETAILED DESCRIPTION OF THE INVENTION

According to FIG. 1*a*, the support body 1 has a cylindrically shaped surface 2, in which the slip rings 3, 4, 5 are mounted interlockingly; along the longitudinal axis 7 of the support body 1 there can be seen the two bearing bushes 8, 9, the respective end regions of support body 1 and of the bearing bushes 8, 9 that can be slipped on along the longitudinal axis 7 being provided with ridges 6', 6", so that an interlocking connection secured against rotation around the longitudinal axis 7 is achieved after the insertion process by virtue of the tongues and grooves formed by the ridges. Both support body 1 and bearing bushes 8, 9 are provided along the longitudinal axis 7 with respective hollow-cylindrical recesses 11, 12, 13, so that they can be slipped onto a shaft; the transition regions 10', 10" of the bearing bushes 8, 9 adjoining the ends of the support body 1 are conically shaped, tapering toward the support body 1, the outside diameter of which is smaller than that of the bearing bushes 8, 9; this ensures that slip ring pickups can be mounted slidingly on support body 1 via the bearing bush or bearing bushes. Adjacent to bearing bush 8 there is shown an axial bearing ring 16, which is provided as a holding device for a swivel arm head for the horizontally swivellable boom or swivel arm of an operating room light.

To assemble an operating room light, a preassembled shaft 14 according to FIG. 1*b* is fixed by means of spacer ring 15 and another spacer ring 59 in a flanged pipe attached to the ceiling. Above the bearing bush 8 there is positioned an axial bearing ring 16, which rests rotatably or slidingly on the bearing bush 8 at some distance to spacer ring 15; according to FIG. 1*c*, the hollow cylindrical shell 17, which is part of the swivel arm head for the boom, which is not shown here, is connected with the axial bearing ring 16 according to FIG. 1*b* by means of a screw inserted through opening 24, so that the cylindrical shell 17 together with the contact carrier 18 according to FIG. 1*d* inserted in opening 19 is positioned exactly with respect to the slip ring 3, 4, 5 of the support body 1 and by means of axial bearing ring 16 is rotatable around stop-free shaft 14. Immobilization of the bearing bush 8 is achieved according to FIG. 3 by pin 21, which is inserted in radial direction into holes 22, 23 through shaft 14; thus support body 1 and bearing bush 9 are also immobilized against rotation relative to shaft 14 by interlocking by virtue of ridges 6', 6" according to FIG. 1*a*; support body 1 is immobilized in axial direction via bearing bush 9 and the locking ring 31, which fits into an annular slot at the free end of shaft 14.

FIG. 1*e* shows the contact carrier 18 in the disassembled condition, so that the spring-loaded slip ring pickups 25, 26, 27, which are normally directed toward the support body, are pointing upward in order to be seen better; each slip ring pickup is provided with a spring-loaded pin contact 25', 25", 26', 26", 27', 27"; the contacts leading to the internal conductors of the swivel arm are marked according to FIG. 1*d* with the numbers 25"', 26"', 27"'. Holding lugs 50, 50' are provided for positioning the contact carrier 18 in the shell 17.

According to FIG. 2*a*, support body 1 consists of an electrically insulating plastic part of substantially cylindrical shape, which is provided at the respective opposite ends with slip-on sliding bearing bushes 8, 9 for turning the cylindrical shell of the swivel arm head according to FIG. 1*b*. In its middle region, support body 1 is provided on its outer circumference with circumferential annular slots, in the depressions of which there are disposed three slip rings 3, 4, 5 in parallel arrangement. On their inside surface directed toward the longitudinal axis 7, the slip rings are provided with contact tabs 36, 37, 38, shown schematically here, in order to provide via opening 40 a connection with the conductors 41, 42, 43 routed inside the shaft 14, explained by reference to FIG. 1*b*.

The bearing bush 8 slipped onto the support body 1 is provided in the region of its front end with a radially directed recess or hole 29, which is used to fix the support body and, according to FIG. 3, pin 21 and hole 22 passing radially through shaft 14 are provided to secure the electrical connection between support body 1 and shaft 14 against rotation. The axial forces due to gravity are—as explained hereinbefore with reference to FIG. 1*b*—transmitted into the shaft 14 through a locking ring 31 inserted into an annular slot 33.

Referring to FIG. 2*b* (right portion), the cross section constructed along line AB and perpendicular to the longitudinal axis is explained in more detail; referring to FIG. 2*b* (left portion), the cross section constructed along line CD is explained on the right side; there the ridges 6' of the support body 1 and 6" of the bearing bush 9 formed as tongues are visible, the ridges 6' and 6" running parallel to the longitudinal axis 7, i.e., in slip-on direction; furthermore, a section through slip ring 4 of the support body 1 is schematically illustrated in FIG. 2*c*.

FIG. 3 schematically shows a longitudinal section through the mounted subassembly consisting of shaft 14, the swivel arm 32 (shown in partly cutaway view) and rotary joint; as can be seen from FIG. 3, the support body 1 together with bearing bushes 8, 9 is mounted on the shaft 14 and is held in immobilized position by means of pin 21, which engages in the hole or opening 22 of the bearing bush 8 as well as in hole 23 of the shaft 14, as well as by means of locking ring 31. The longitudinal axis of shaft 14, which has substantially cylindrical symmetry, is denoted by 7 in this case also, since it coincides with the longitudinal axis 7 of the support body 1. The support body 1 with the bearing bushes 8, 9 is secured against axial shifting by the locking ring 31, which engages in annular slot 33 of the shaft 14; the bearing bush 9 then bears with a portion of its lower sliding bearing 35 on the periphery of locking ring 31. By referring to FIG. 3 it can be seen that the slip rings 3, 4, 5 are electrically connected by means of internal contacts 36, 37, 38 with the conductors 41, 42, 43 routed in the inside and through opening 40 in the cylindrical shell of the shaft 14. By virtue of the pin 21 inserted through the openings of bearing bush 8 and shaft 14 and the immobilization against rotation provided by ridges 6', 6", support body 1 is secured against rotation relative to shaft 14, and so the connections between the conductors 41, 42, 43 and their contacts 36, 37, 38 on the slip rings are also secured against rotation.

Support body 1 is enveloped by the swivel arm head 44, which also has substantially cylindrical shape, and which is firmly attached mechanically to the swivel arm 32, which is shown in partial view here.

By referring to FIG. 3 it can be seen that swivel arm head 44 is connected at its upper front end with the axial bearing ring 16, which provides the swivel arm head 44 with the ability to rotate on the bearing bush 8. The axial force of the swivel arm head 44 is transmitted through locking ring 31 and annular slot 33 into shaft 14.

Via the axial bearing ring 16 lying loosely on the front end of the upper bearing bush 8, the swivel arm head 44 is held axially and rotatably by the pins 47 and 48 connecting the shell 17 and axial bearing ring 16; its inside shell surface is radially braced. This ensures a permanent ability to rotate inside the rotary joint consisting of swivel arm head and shaft.

In a preferred embodiment, the intermediate space 49 between axial bearing ring 16 and shaft 14 is provided with a rolling bearing; the rolling bearing is preferably constructed as a needle bearing, the axis of rotation of the needle rollers being parallel to longitudinal axis 7.

Furthermore, it can be seen in the region of the swivel arm 32 shown in partly cutaway view in FIG. 3 that the slip ring pickups 25, 26, 27 connected here with the internal conductors 51, 52, 53 of the swivel arm 32 are held by a common, spring-loaded contact carrier 18 and bear radially by means of spring pressure upon the slip rings 3, 4, 5, thus creating constant contact inside the rotary joint between the conductors 41, 42, 43 of the shaft 14 and the conductors 51, 52, 53 of the swivel arm.

A particular advantage is that the contact carrier 18 according to FIG. 1*d*, 1*e* mounted in the swivel arm head is positioned by means of holding lugs 50 and 50', and that the slip ring pickups 25, 26, 27, after being slipped on in axial direction onto the support body 1 provided with bearing bushes, can be correctly adjusted with respect to the slip rings 3, 4, 5 without further assembly.

It is also possible to provide, in the end region of a shaft, a plurality of support bodies and their associated swivel arms disposed axially relative to each other, two of which swivel arms are used, for example, to hold one light housing each, while one swivel arm is provided to hold a video camera with electrical connection via swivel arm head and slip rings.

FIG. 4 schematically shows the structure of an operating room light with two support bodies on a common shaft for holding two swivel arms, the swivel arm heads 44 of which are shown in coaxial relationship; shaft 14 is held by a flanged pipe 57, which is shown in partly cutaway view. Between flanged pipe 57 and the lower end 58 of the shaft 14 there are disposed two support bodies 1 one above the other in coaxial relationship, each of which is provided at its ends with bearing bushes 8, 9 respectively, as is described in more detail with reference to FIGS. 1*a*, 1*b*, 2*a* and 3.

Referring to FIG. 4, it can be seen that each of the two support bodies 1 with its slip rings 3, 4, 5 is electrically connected, together with the slip ring pickups 25, 26, 27 in the symbolically represented swivel arm head 44, to contact carrier 18, although to permit better clarity not all reference numbers of the two support bodies are shown. The swivel arm 32 is shown in partly cutaway view; referring to this figure, it can be seen that each of the two support bodies 1 is secured against slipping along the shaft 14 by means of its lower bearing bush 9 through its own locking ring 31, each of which is disposed in an annular slot of the shaft 14.

For better clarity, only part of the conductors 41, 42 43 inside the shaft are shown; for the purpose of individual current supply to the instruments positioned on the swivel arm 32, each conductor is routed separately to a monitor or control unit (not shown here); to simplify the wiring, however, it is also possible, by using modulators and demodulators, to transmit control and video signals for lighting, camera and instrument functions to the three common conductors to which the slip rings are connected in parallel.

By virtue of the conical transition regions 10 between support body 1 and the bearing bushes 8, 9, it is possible in simple manner to slip the upper swivel arm head 44 first over the lower support body 1 with its bearing bushes 9, 8 onto the upper support body 1, after which the swivel arm head 44 for the lower support body 1 can be attached. Locking of the swivel arm heads 44 against rotation is achieved in each case by connecting the pin 47 with the axial bearing ring 16; this arrangement is optimized from the viewpoint of maintenance and servicing purposes, permitting simple assembly and disassembly of swivel arm heads with the associated instrument units. The shaft 14 is held in the flanged pipe 57 by two spacer rings 15, 59 disposed coaxially one above the other, each being provided with radial holes 60, 61 so that securing pins 62, 63 can be passed through the shell of flanged pipe 57 into openings of the barrel-shaped tube of shaft 14. The lower end 58 of the shaft 14 is closed by an attachable protective cap.

Instead of the three-piece contacting and holding elements consisting of support body 1, bearing bush 8 and bearing bush 9, it is also possible to use an injection-molded part comprising the support body and bearing bushes as one integral component.

We claim:

1. An operating room light suspended from a ceiling having at least one swivel arm (32) through which electric conductors are routed, said at least one swivel arm being mounted on and rotatable about a shaft (14) protruding from the ceiling and containing internal electric conductors, slip rings (3,4,5) which are electrically insulated from each other are disposed on the shaft in a region of its external face for making electrical connections via slip ring pickups (25, 26, 27) which maintain contact by spring pressure and which are housed inside a sleeve-like swivel-arm head (44) partially formed as a shell and constituting part of a rotary joint, wherein the sleeve-like swivel arm head is axially and radially mounted on the shaft by means of a support body (1) with the slip rings, which are embedded in an electrically insulating cylindrical external surface of the support body, the slip rings and external surface of the support body having the same outside diameter, wherein the support body, viewed in an axial direction, is interposed between bearing bushes (8, 9) on the shaft, the bearing bushes functioning as sliding bearings and each having axially symmetric external surfaces, each of which has a larger outside diameter than that of the support body, at least one of the bearing bushes having a transition region (10', 10") which is tapered toward the support body;

interlocking means to prevent, at least between the shaft and the support body, axial shifting and rotation in a circumferential direction, and wherein the swivel arm head is rotatably mounted by means of an axial bearing ring (16) that bears on a front face of the upper bearing bush (8), and a contact carrier (18) with slip ring pickups (25, 26, 27) being exactly positioned by insertion through an opening (19) in the shell (17) of the swivel arm head in a connection region between the swivel arm and the swivel arm head, the contact carrier being secured against rotation and axial shifting.

2. The operating room light as defined by claim 1, wherein each of the bearing bushes (8, 9) is configured such that each bearing bush can be coaxially placed onto one end of the support body (1).

3. The operating room light as defined by claim 1, wherein the support body (1) includes, proximate each end thereof, at least one of grooves and tongues into which interlocking engagement occurs with at least one of tongues and grooves which are positioned on an internal region of the slip-on bearing bushes (8, 9), the interlocking engagement preventing rotation between the support body (1) and the bearing bushes (8, 9).

4. The operating room light as defined by claim 1, wherein the support body (1) and the bearing bushes (8,9) are formed together as a single injection-molded part.

5. The operating room light as defined by claim 1, further comprising a locking ring (31) axially immobilized on the shaft (14) which prevents shifting, and a securing pin (21) connected in a radial direction with the shaft which prevents rotation.

6. The operating room light as defined by claim 1, further comprising a rolling bearing disposed between the axial bearing ring (16) and the shaft (14).

7. The operating room light as defined by claim 1, wherein the slip ring pickups (25, 26, 27) are connected with an end region of conductors (51, 52, 53) in the swivel arm (32), the contact carrier (18) for the slip ring pickups (25, 26, 27) being passed through an aperture (19) of the swivel arm (32) and the swivel arm head (44).

* * * * *

UNITED STATES PATENT AND TRADEMARK OFFICE

CERTIFICATE OF CORRECTION

PATENT NO. : 6,030,103

DATED : February 29, 2000

INVENTOR(S) : Uwe GAMPE et al.

It is certified that error appears in the above-indentified patent and that said Letters Patent is hereby corrected as shown below: On the title page:

Item [73] Assignee, change "Heraeus Holding GmbH"
to --Heraeus Med GmbH--;

Item [56] References Cited, under "U.S. PATENT DOCUMENTS",
insert --5,379,205 1/1995 Peng

FOREIGN PATENT DOCUMENTS

| | | |
|---|---|---|
| 1 193 897 | 10/1966 | Germany |
| G 89 13 757.4 | 5/1991 | Germany |
| 40 04 648 C2 | 8/1991 | Germany |
| 42 10 649 A1 | 10/1992 | Germany |
| 395,153 | 2/1909 | France--. |

Signed and Sealed this

Fifteenth Day of May, 2001

Attest:

Nicholas P. Godici

NICHOLAS P. GODICI

*Attesting Officer* *Acting Director of the United States Patent and Trademark Office*